(12) United States Patent
Tokuyama et al.

(10) Patent No.: US 9,500,798 B2
(45) Date of Patent: Nov. 22, 2016

(54) LIQUID CRYSTAL DISPLAY DEVICE COMPRISING A FRAME HAVING HOLES WHEREIN A PLURALITY OF LIGHT SOURCES ARE DISPOSED

(71) Applicant: Japan Display Inc., Tokyo (JP)

(72) Inventors: Hiroshi Tokuyama, Tokyo (JP); Norihiro Nakamura, Tokyo (JP)

(73) Assignee: Japan Display Inc., Tokyo (JP)

( * ) Notice: Subject to any disclaimer, the term of this patent is extended or adjusted under 35 U.S.C. 154(b) by 50 days.

(21) Appl. No.: 14/559,954

(22) Filed: Dec. 4, 2014

(65) Prior Publication Data

US 2015/0160399 A1     Jun. 11, 2015

(30) Foreign Application Priority Data

Dec. 5, 2013 (JP) .................................. 2013-251944

(51) Int. Cl.
  *F21V 8/00* (2006.01)
  *G02F 1/1333* (2006.01)

(52) U.S. Cl.
  CPC ........... *G02B 6/0031* (2013.01); *G02B 6/0068* (2013.01); *G02B 6/0085* (2013.01); *G02F 2001/133317* (2013.01); *G02F 2203/02* (2013.01)

(58) Field of Classification Search
  CPC ............. G02F 2203/02; G02F 1/1336; G02F 2001/133607; G02F 2001/133616; G02F 6/0011; G02B 6/0013; G02B 6/0015; G02B 6/0016; G02B 6/0023; G02B 6/0025; G02B 6/0026; G02B 6/003
  See application file for complete search history.

(56) References Cited

U.S. PATENT DOCUMENTS

2010/0053049 A1* 3/2010 Sato .................. G02F 1/133308
345/87

FOREIGN PATENT DOCUMENTS

JP        2008-216406 A        9/2008

* cited by examiner

*Primary Examiner* — Paul Lee
(74) *Attorney, Agent, or Firm* — Typha IP LLC (57) ABSTRACT

There is provided a liquid crystal display device including: a light source; a light guiding plate which takes in light generated from the light source, from a light incident surface, and emits the light from an emission surface as planar light; a plate-shaped member which has a surface perpendicular to an emission direction of the light of the light source and is disposed at least on the periphery of the light source; and a reflection member which covers from the emission surface of the light guiding plate to the plate-shaped member, the reflection member being made of a material that reflects the light.

8 Claims, 9 Drawing Sheets

RELATED ART

LIQUID CRYSTAL DISPLAY DEVICE COMPRISING A FRAME HAVING HOLES WHEREIN A PLURALITY OF LIGHT SOURCES ARE DISPOSED

CROSS-REFERENCE TO RELATED APPLICATION

The present application claims priority from Japanese application JP2013-251944 filed on Dec. 5, 2013, the content of which is hereby incorporated by reference into this application.

BACKGROUND OF THE INVENTION

1. Field of the Invention

The present invention relates to a liquid crystal display device.

2. Description of the Related Art

A liquid crystal display device is widely used as a display device of an information communication terminal, such as a computer, or a television receiver. The liquid crystal display device is a device which displays an image by changing an orientation of a liquid crystal composition contained between two substrates according to a change in an electric field, and by suppressing a level of transmission of light which passes through the two substrates and the liquid crystal composition.

In the liquid crystal display device, a lighting device which is called a backlight is generally used as a light source. As a lighting method of the backlight, a direct lighting method which has the light source on a rear side of a liquid crystal display surface and a side lighting method which reflects the light illuminated from a side and illuminates the liquid crystal display surface, are known. In the liquid crystal display device which is used in a mobile communication terminal apparatus or the like, such as a mobile phone in recent years, since a small size and power saving are required, the side lighting method which has a light emitting diode (LED) as the light source has been used.

In JP 2008-216406 A, in the liquid crystal display device of the side lighting method, a heat sink which dissipates heat generated by light emission of the LED is disclosed.

SUMMARY OF THE INVENTION

Figure 9:
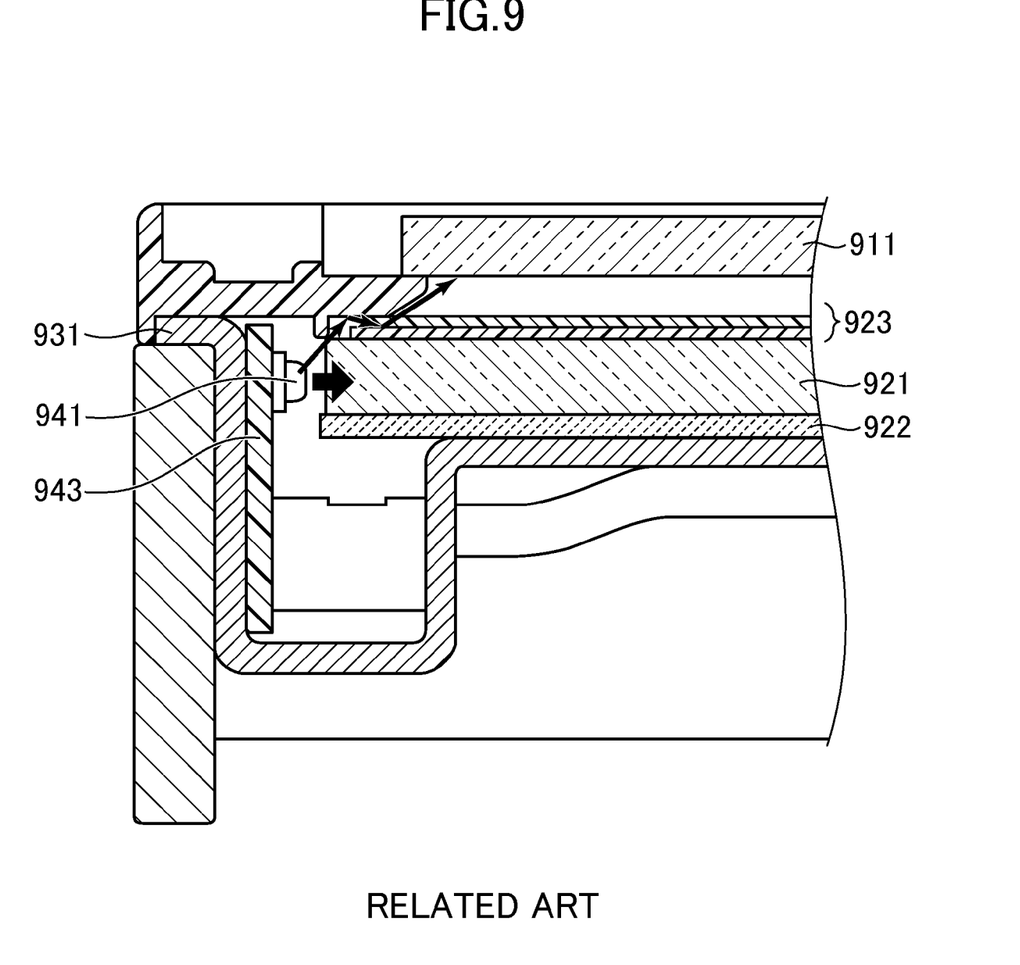
FIG. 9 is a view illustrating a cross section of the vicinity of a light source of a liquid crystal display device of a side lighting method in the related art.

In a liquid crystal display device of a side lighting method, light is incident from a light incident surface of a side surface of a light guiding plate, and planar light is emitted to a display panel side from an emission surface which is an upper surface. At this time, since there is a considerable void between an LED and the light incident surface of the light guiding plate, the light leaks from the void. FIG. 9 illustrates a cross section of the vicinity of a light source of the liquid crystal display device of the side lighting method, and illustrates a state of the leaking of light. As illustrated in the drawing, most of the light emitted from an LED 941, which is a light source of a light source wiring substrate 943 installed in a frame 931, is incident on a light guiding plate 921 which is disposed at a position facing the LED 941, and is reflected by a reflection sheet 922 which is disposed below the light guiding plate 921. Accordingly, most of the light is emitted as the planar light to a display panel 911. However, a part of the light emitted from the LED 941 is emitted upward from the light guiding plate 921 as illustrated by the arrows, and repeats the reflection. Accordingly, there is a concern that a part of the light goes into an optical sheet 923 or the like which is mounted on the light guiding plate 921, generates a bright line or the like by irradiating the display panel 911, and influences display quality.

The present invention is made in view of such circumstances, and is to provide a liquid crystal display device of a side lighting method which has improved display quality.

According to an aspect of the present invention, there is provided a liquid crystal display device including: a light source; a light guiding plate which takes in light generated from the light source, from a light incident surface, and emits the light from an emission surface as planar light; a plate-shaped member which has a surface perpendicular to an emission direction of the light of the light source and is disposed at least on the periphery of the light source; and a reflection member which covers from the emission surface of the light guiding plate to the plate-shaped member, the reflection member being made of a material that reflects the light.

In the aspect, the reflection member may have an L-shaped cross section and be adhered to a surface of the plate-shaped member.

In the aspect, the liquid crystal display device may further include a plurality of the light sources. When the light guiding plate is viewed in a planar view, an area which is irradiated with the light from the plurality of light sources may include fore-light-source areas each of which is a belt-shaped area extending in the emission direction of the light of the plurality of light sources, and inter-light-source areas each of which is a belt-shaped area other than the fore-light-source areas. The reflection member and the light guiding plate may be adhered to each other only in the inter-light-source areas.

In the aspect, the liquid crystal display device may further include a liquid crystal panel which controls transmission of the light by orientating a liquid crystal composition. When the light guiding plate is viewed in a side surface view, an angle α which is made by a straight line that links from an end of the reflection member on the light guiding plate to a display area of the liquid crystal panel in the shortest distance, and the emission surface of the light guiding plate, may be equal to or less than 26°.

In the aspect, the liquid crystal display device may further include a plurality of the light sources and a light source wiring substrate which electrically connects the plurality of light sources. The plate-shaped member may be a frame which maintains the light guiding plate and the light source wiring substrate. The frame may have holes at a position where the plurality of light sources of a frame front surface, which is a surface facing the light incident surface, is disposed. The light source wiring substrate may be placed at the frame so that the plurality of light sources are disposed inside the holes and the light of the plurality of light sources are emitted from a rear surface side of the frame front surface.

In the aspect, the holes of the frame may be in a tapered shape which widens toward an optical system of the light guiding plate.

In the aspect, the liquid crystal display device may further include a heat sink which dissipates heat generated from the light source on a surface opposite to a surface on which the light source of the light source wiring substrate is disposed. The frame may be in contact with the surface on which the light source of the light source wiring substrate is disposed so that the heat generated from the light source is dissipated. In this case, the light source wiring substrate and the frame, and the light source wiring substrate and the heat sink may be respectively in contact with each other via a resin including a glass filler.

In the aspect, a reflection sheet may be disposed on the frame front surface of the frame.

In the aspect, the plate-shaped member may be a light source wiring substrate which electrically connects the light source.

According to another aspect of the present invention, there is provided a liquid crystal display device including: a liquid crystal panel; a light source; a circuit substrate including the light source; a light guiding plate including a light incident surface receiving the light from the light source and an emission surface emitting the light passing through the incident surface; a frame accommodating the light guiding plate; a side wall of the frame formed along the light incident surface; an inner side surface of the side wall facing the light incident surface; an outer side surface of the side wall being opposite to the inner side surface; and an opening which is formed on the side wall. The circuit substrate is arranged at a side of the outer side surface. The light source is disposed in the opening. A reflection member covers from an edge part of the opening to the light incident surface.

In the aspect, the reflection member may have an L-shaped cross section and be adhered to the inner side surface.

In the aspect, the liquid crystal display device may further include a plurality of the light sources. The light guiding plate may have fore-light-source areas in front of the plurality of light sources and inter-light-source areas between two adjacent ones of the fore-light-source areas. The reflection member and the light guiding plate may be adhered to each other only in the inter-light-source areas.

In the aspect, the opening of the frame may be in a tapered shape which widens toward the light guiding plate.

In the aspect, a heat dissipation member may be disposed on a surface of the circuit substrate, the surface is opposite to a surface on which the light source is disposed.

In the aspect, the circuit substrate and the frame may be in contact with each other via a resin including a glass filler.

In the aspect, a heat sink which dissipates the heat generated from the light source may be disposed on the surface opposite to the surface on which the light source of the circuit substrate is disposed. The circuit substrate and the heat sink may be in contact with each other via the resin including the glass filler.

In the aspect, a reflection sheet may be disposed on the inner side surface.

DETAILED DESCRIPTION OF THE INVENTION

Hereinafter, each embodiment of the invention will be described with reference to the drawings. The disclosure is merely an example. Those who are skilled in the art can easily consider appropriate changes without departing from the scope of the invention and eventually include the changes in the range of the invention. In addition, in order to make the description clear, there is a case where a width, a thickness, a shape, or the like, of each portion is shown schematically in the drawings compared to a real case. However, the drawings are merely an example, and the interpretation of the invention is not limited thereto. In addition, in the specification and each drawing, common constituent elements which are already described in previous drawings are given the same reference numerals, and detailed descriptions thereof will be omitted.

Figure 1:
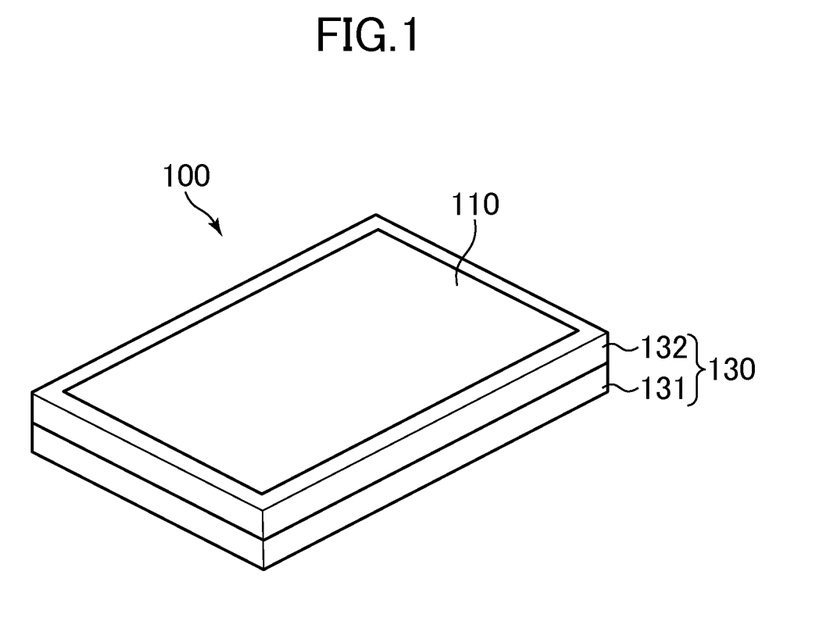
FIG. 1 is a schematic view illustrating a liquid crystal display device according to an embodiment of the invention.

FIG. 1 is a schematic view illustrating a liquid crystal display device 100 according to an embodiment of the invention. As illustrated in the drawing, the liquid crystal display device 100 includes a liquid crystal module 110 which controls transmission of light by orientating liquid crystal sealed between two substrates; and a frame 130 which fixes the liquid crystal module 110. Here, the frame 130 has an upper frame 132 on a display surface side and a lower frame 131 opposite to the upper frame 132. In addition, in the embodiment, the upper frame 132 and the lower frame 131 are separated, but may be the frame 130 which is configured as one body.

Figure 2:
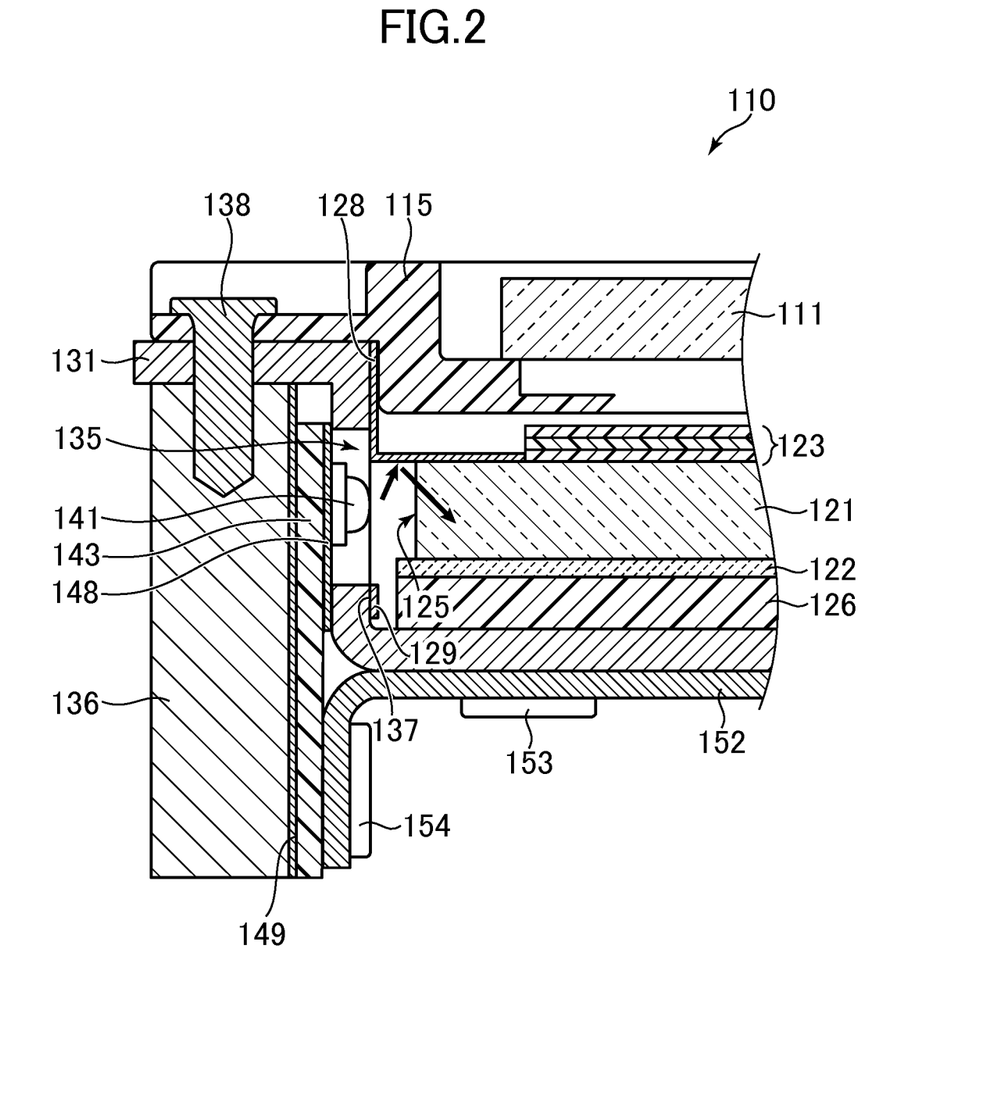
FIG. 2 is a schematic cross-sectional view illustrating an arrangement of optical members in the vicinity of a light source of a liquid crystal module in FIG. 1.

FIG. 2 is a schematic cross-sectional view illustrating an arrangement of optical members in the vicinity of an LED 141 which is a light source of the liquid crystal module 110 in FIG. 1. As illustrated in FIG. 2, the LED 141 which is the light source is mounted on a light source wiring substrate 143 on which a circuit that electrically connects the LED 141 is formed. On a rear surface of the light source wiring substrate 143, a heat sink 136 for dissipating heat generated by the LED 141 is installed. In addition, by a resin panel 115 and a screw 138 for mounting a liquid crystal panel 111, the heat sink 136 is fixed to the lower frame 131. The lower frame 131 and the light source wiring substrate 143 are fixed by screws 153 and 154 by using a fixing substrate 152 so that the LED 141 goes into a hole 135 of the lower frame 131. On the lower frame 131, a reflection sheet 122 is mounted via a cushion rubber 126, and a light guiding plate 121 is mounted thereon to have the same height as the LED 141. On the light guiding plate 121, an optical sheet 123 which comprises a prism sheet and a dispersion sheet is mounted. The lower frame 131 is disposed at least on the periphery of the LED 141, and is a plate-shaped member which has a surface perpendicular to an emission direction of the light of the LED 141. In order to reflect the leaked light, a reflection member 128 which covers from the emission surface close to a light incident surface 125 of the light guiding plate 121 to the lower frame 131 and has an L-shaped cross section, is disposed between the lower frame 131 and the light guiding plate 121.

By this configuration, most of the light emitted from the LED 141 goes into the light guiding plate 121 from the light incident surface 125 of the light guiding plate 121, repeats the reflection on upper and lower surfaces in the light guiding plate 121, and is emitted as planar light from the emission surface of the liquid crystal panel 111 side. Here, when the light emitted from the LED 141 is reflected by an inner wall surface of the hole 135, there is a concern that uniformity of the emitted planar light, that is, display quality, is influenced. For this reason, the configuration is designed not to reflect the light by the inner wall surface of the hole 135. In other words, a plate thickness of the lower frame 131 is determined by matching a height of the LED 141 or a tapered angle of the emitted light. In addition, in the above-described configuration, since the LED 141 is disposed in the hole 135 of the lower frame 131, the lower frame 131 can further approach the light guiding plate 121, and a size of a frame area which is formed on the periphery of the display area can be further reduced. In addition, it is possible to reduce the light which does not directly go into the light incident surface 125 of the light guiding plate 121 from the LED 141, to suppress generation of a bright line, or the like, and as a result, to improve display quality. In addition, the lower frame 131 is not in a U shape to cover the light source wiring substrate 143, and can be provided with the light source wiring substrate 143 on an outer side of the lower frame 131. For this reason, it is possible to make a thinner type of lower frame 131.

In addition, a slight void is generated between the lower frame 131 and the light guiding plate 121. However, as illustrated by the arrows in the drawing, the reflection member 128 reflects light which does not face the light incident surface 125 of the light guiding plate 121 and faces further upward than the light incident surface 125, among the rays of light emitted from the LED 141, and makes the light approach the light incident surface 125 of the light guiding plate 121. Accordingly, the light which is emitted further upward than the light incident surface 125 of the light guiding plate 121 when the reflection member 128 is not provided, causes the bright line or the like that reaches the liquid crystal panel 111 from the optical sheet 123 or the like, and can be incident on the light guiding plate 121, and display quality can be improved. In addition, as the light which is the leaked light in the related art is used, brightness in the vicinity of the center of the display area is improved by improving efficiency of utilization of the light, and a brightness distribution is improved by suppressing brightness unevenness near an outer periphery of the light guiding plate 121. For this reason, it is possible to improve display quality.

In order to enhance heat dissipation of the heat generated by the LED 141, the light source wiring substrate 143 is in contact with a surface of the lower frame 131, and the rear surface thereof is in contact with the heat sink 136. In particular, in the embodiment, a thermal conductivity is enhanced as heat conductive members 148 and 149 are respectively nipped between the light source wiring substrate 143 and the lower frame 131, and between the light source wiring substrate 143 and the heat sink 136. Here, the heat conductive member 149 can be a resin which includes a glass filler, for example. Meanwhile, a configuration in which the heat conductive member 149 is not used may be employed. Furthermore, in order to return the light which is emitted from the light incident surface 125 of the light guiding plate 121 to the inside of the light guiding plate 121, a reflection sheet 129 is provided on a frame front surface 137 (a side or a lower part of the hole 135) which is a surface opposite to the light incident surface 125 of the lower frame 131. Accordingly, it is possible to improve efficiency of utilization of the light, and to further improve a brightness distribution on the emission surface of the light guiding plate 121.

The lower frame 131 is formed by bending a metal using a mold. As a shape of the lower frame 131 in the embodiment is simplified with a lower number of times of bending than that of a shape of a frame 931 in FIG. 9, it is possible to suppress a processing cost including a mold cost or the like, to reduce the number of defective processed products generated, and to improve yield. In addition, since the LED 141 which is the light source can be exchanged without removing the frame 130, it is possible to more easily respond to defects when repairing or manufacturing. Furthermore, since the lower frame 131 does not have a U shape like the frame 931 in FIG. 9, and has a shape which is bent only once, it is possible to conduct and dissipate the heat conducted to the lower frame 131 to a position which is further apart from the LED 141. Furthermore, since the heat sink 136 is installed on the rear surface of the light source wiring substrate 143 directly or only via the heat conductive member 149, it is possible to dissipate the heat with excellent efficiency. Therefore, in the configuration of the embodiment, it is possible to conduct the heat in many more directions from the LED 141, and to dissipate even the conducted heat with high efficiency. In addition, since the number of times of bending in the vicinity of the light source of the lower frame 131 is small, it is possible to dissipate the heat with high efficiency without leaving the heat in the vicinity of the light source. Since deterioration of the light source is suppressed by enhancing the efficiency of heat dissipation in this manner, it is possible to keep the high display quality for a long period of time, and to make a service life of the liquid crystal display device 100 long.

The reflection member 128 is adhered to the lower frame 131 which is the plate-shaped member by an adhesive tape or the like. In addition, the reflection member 128 may be adhered or may not be adhered to the emission surface on the light incident surface 125 side of the light guiding plate 121. In addition, the reflection member 128 may be a reflection tape comprising a reflection film having flexibility and an adhesive material, and may have a configuration in which the adhesive tape is stuck to the plate-shaped member having reflectivity. As the light guiding plate 121 is adhered to the reflection member 128, the light guiding plate 121 is fixed to the lower frame 131. The lower frame 131 is usually formed to be provided with a clearance by considering expansion and contraction of the light guiding plate 121 due to temperature. Accordingly, the light guiding plate 121 can move with respect to the lower frame 131. For this reason, there is a concern that a defect, such as generation of a rattling sound, is generated by the movement of the light guiding plate 121. Furthermore, there is a concern that the light guiding plate 121 gets damaged and the emitted light is influenced, by the rattling. At the same time, there is a concern that irregularity of the position of the light guiding plate 121 causes irregularity of a brightness distribution and irregularity of efficiency of utilization of the light. However, by fixing the light guiding plate 121 to the lower frame 131 via the reflection member 128, it is possible to suppress the rattling while retaining the clearance with respect to expansion and contraction of the light guiding plate 121. Accordingly, it is possible to prevent the rattling sound, and to suppress irregularity of a brightness distribution and efficiency of utilization of the light.

Figure 3:
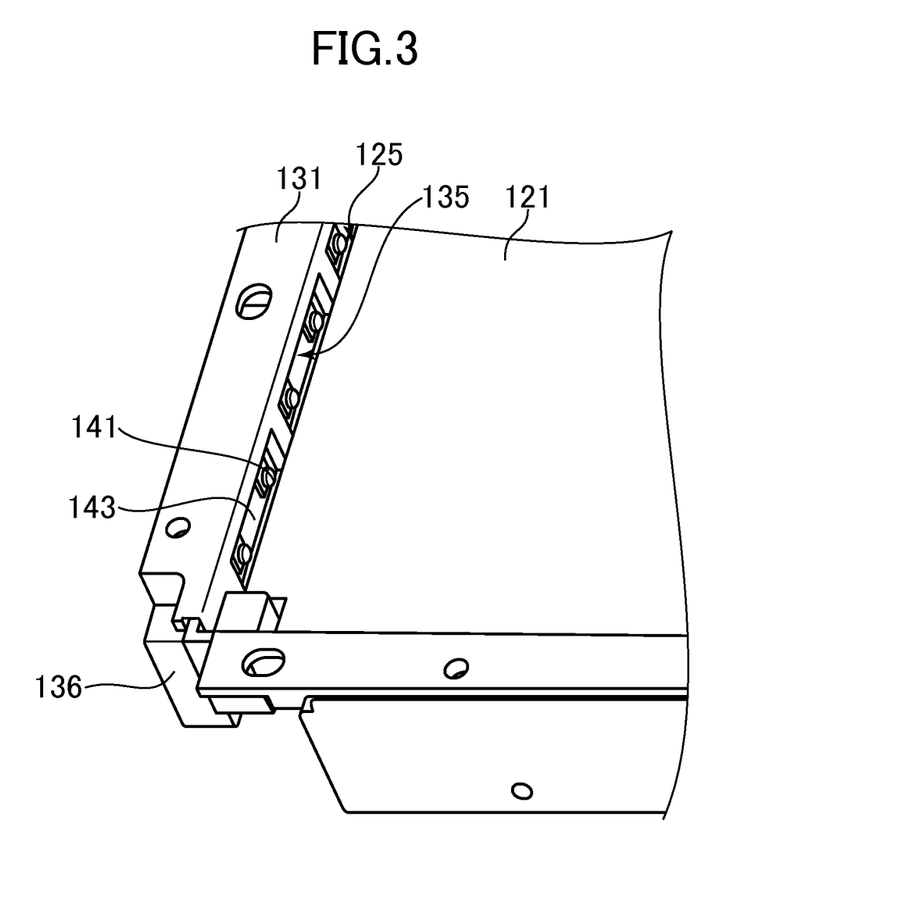
FIG. 3 is a perspective view illustrating an arrangement of a lower frame, the light source, and a light guiding plate.

FIG. 3 is a perspective view illustrating an arrangement of the lower frame 131, the LED 141, and the light guiding plate 121. As illustrated in the drawing, a plurality of LEDs 141 is disposed along the light incident surface 125. In the same drawing, two LEDs 141 are disposed in one hole 135. However, the invention is not limited thereto. One LED 141 may be disposed in one hole 135, or three or more LEDs 141 may be disposed in one hole 135.

Figure 4:
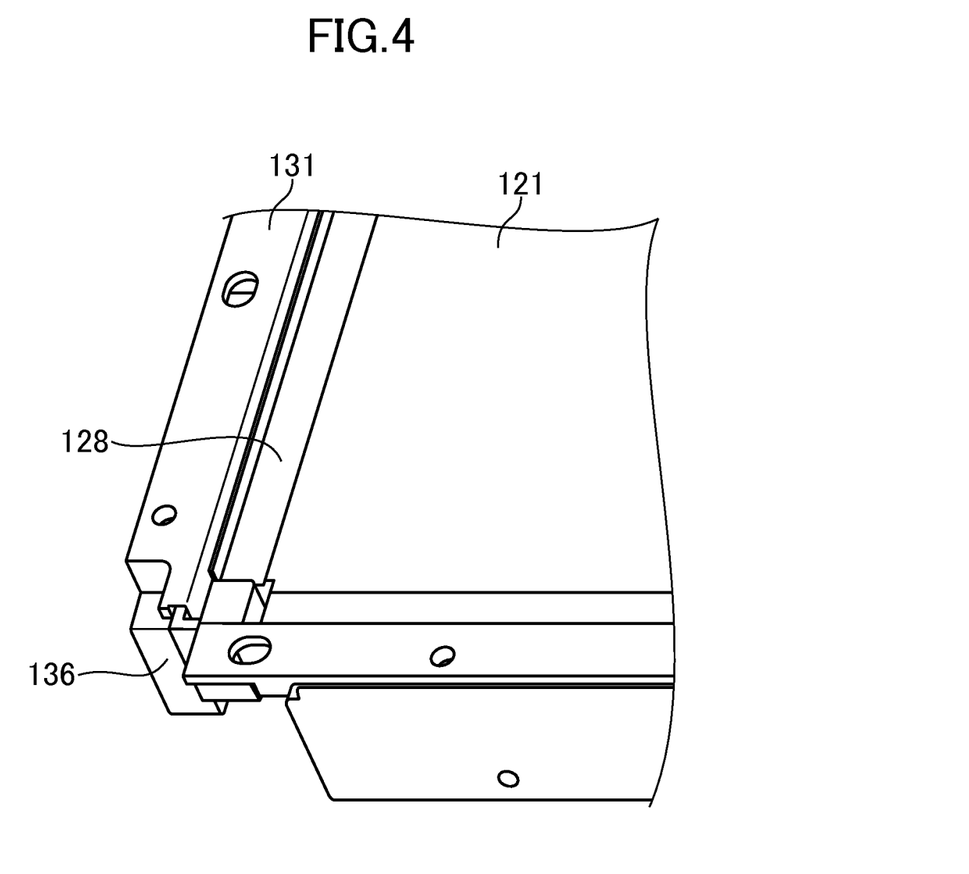
FIG. 4 is a perspective view of a case where a reflection member is disposed in FIG. 3.

FIG. 4 is a perspective view of a case where the reflection member 128 is disposed in FIG. 3. As described above, the reflection member 128 is disposed to cover from the end of the LED 141 side on the emission surface of the light guiding plate 121 to the lower frame 131. However, as illustrated in the drawing, the reflection member 128 may be disposed to cover not only from the end of the LED 141 side, but also from an end of another side of the light guiding plate 121 to the lower frame 131. By disposing the reflection member 128 even in a part other than the end of the LED 141 side, it is possible to return the light which is emitted from an end portion of the light guiding plate 121 and emitted upward from between the lower frame 131 and the light guiding plate 121, to the inside of the light guiding plate 121, and to improve efficiency of utilization of the light.

When the light guiding plate 121 and the reflection member 128 are adhered to each other, the light guiding plate 121 and the reflection member 128 are adhered by an adhesive material, such as the adhesive tape. However, since the light guiding plate 121 and the reflection member 128 are disposed close to the LED 141 which is the light source, when continuously using the light guiding plate 121 and the reflection member 128, there is a case where a color thereof changes to a yellowish color or the like by deterioration of the adhesive material due to the heat. In this case, there is a concern that the light reflected by a part of the adhesive material changes color, and display quality of the display device is influenced.

Figure 5:
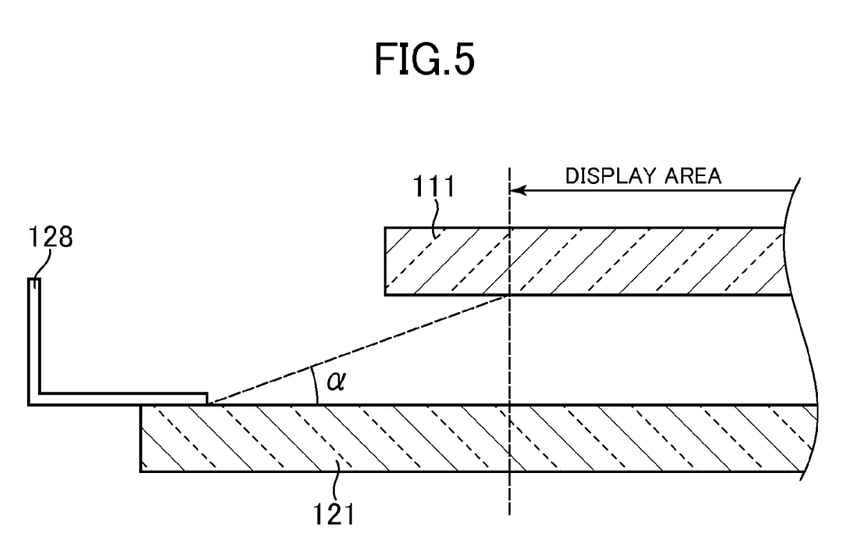
FIG. 5 is a schematic side surface view illustrating an arrangement of the light guiding plate, a liquid crystal panel, and the reflection member.

FIG. 5 is a schematic side surface view illustrating an arrangement of the light guiding plate 121, the liquid crystal panel 111, and the reflection member 128. According to the study of the inventors, as illustrated in the drawing, an angle α which is made by a straight line that links from the end of the reflection member 128 on the light guiding plate 121 to an end of the LED 141 side of the display area of the liquid crystal panel 111, and the emission surface of the light guiding plate 121, is equal to or less than 26°. Accordingly, it is found that an influence given to display quality can be suppressed even when the color is changed due to the deterioration of the adhesive material. Therefore, as the light guiding plate 121 and the reflection member 128 are adhered to each other by leaving a space between the end of the reflection member 128 and the display area so that the angle α is equal to or less than 26°, it is possible to prevent the rattling sound, to suppress irregularity of a brightness distribution and improve efficiency of utilization of the light, and further, to suppress an influence by the color change of the adhesive material to a minimum, and to keep high display quality even when the device is used for a longer period of time.

Figure 6:
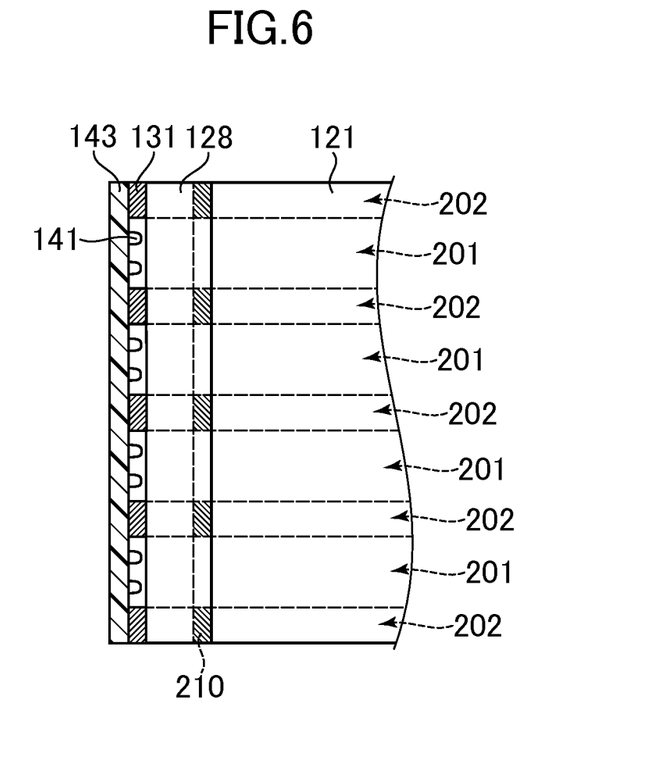
FIG. 6 is a schematic view illustrating the reflection member which is disposed between the light guiding plate and the lower frame when viewed from a planar view.

FIG. 6 is a schematic view illustrating the reflection member 128 which is disposed between the light guiding plate 121 and the lower frame 131 when viewed from a planar view. Entire surfaces of the light guiding plate 121 and the reflection member 128 may not be adhered to each other by the adhesive material, such as the adhesive tape, and the light guiding plate 121 and the reflection member 128 may be partially adhered to each other. In this case, for example, as illustrated in the drawing, when an area of a direction in which the light is emitted from the LED 141 is divided into a plurality of fore-light-source areas 201 (each of an area which extends in the emission direction of the light corresponding to a place where the hole 135 is formed) which extends in the emission direction of the light from the LED 141 which is the light source, and inter-light-source areas 202 (each of an area which extends in the emission direction of the light corresponding to an area which is between the holes 135) which is an area other than the fore-light-source areas 201, an adhesion in the fore-light-source area 201 which can be considered that deterioration of the adhesive material proceeds much faster by receiving the heat from the LED 141 may not be performed, and an adhesion may be performed only in an area 210 included in the inter-light-source areas 202. In other words, in the area where the reflection member 128 and the light guiding plate 121 are overlapped, as the area 210 which is further overlapped with the inter-light-source areas 202 or a part which is included in the area 210 is considered as an adhesion area, firstly, it is possible to suppress an influence of color change to the entire area since an area where the color change occurs due to deterioration is limited. Secondly, it is possible to delay the progress of the color change since the adhesion is performed in the inter-light-source areas 202 where the progress of the deterioration has difficulty to proceed. Therefore, as the light guiding plate 121 and the reflection member 128 are adhered to each other only in the inter-light-source areas 202, it is possible to prevent the rattling sound, to suppress irregularity of a brightness distribution and improve efficiency of utilization of the light, and further, to suppress an influence by the color change of the adhesive material to a minimum, and to keep high display quality even when the device is used for a longer period of time. In addition, in the inter-light-source areas 202, an area on the light guiding plate 121 which is further on an end than the fore-light-source area 201 of the light source at the farthest end when viewed in a planar view, is also included.

Figure 7:
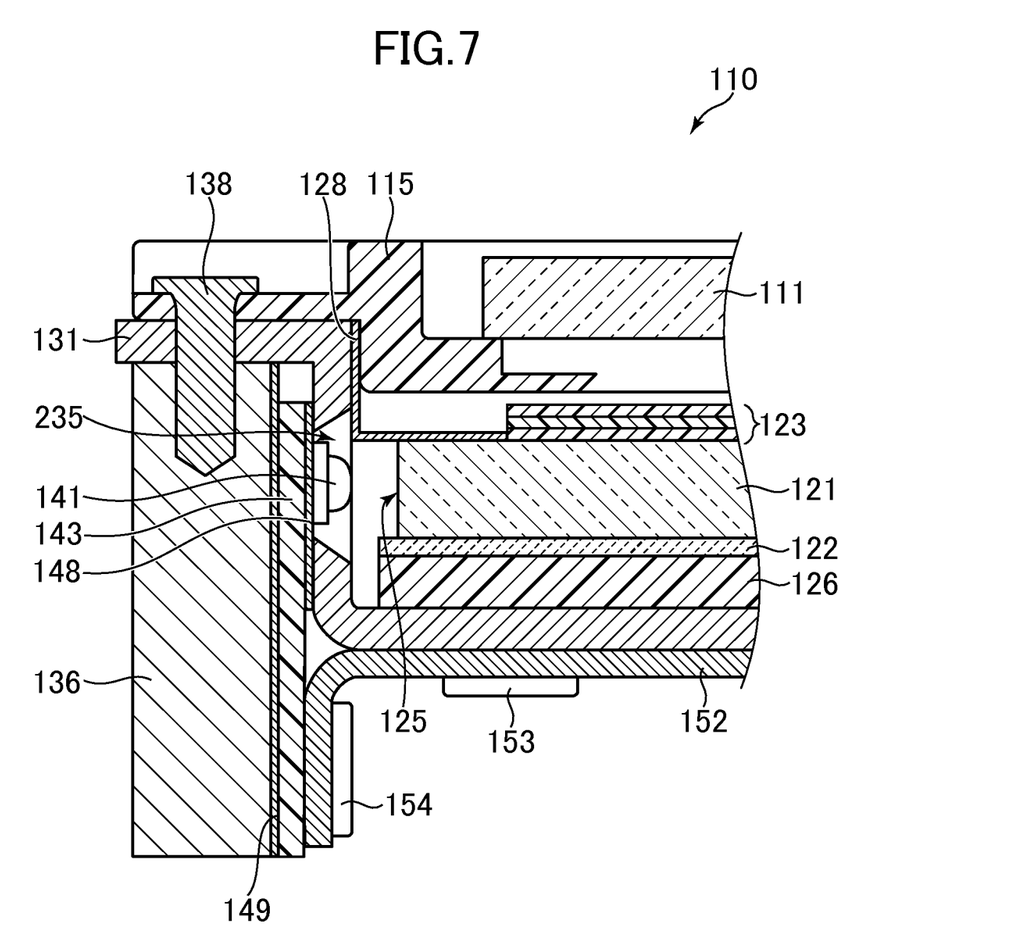
FIG. 7 is a view illustrating an example in which a cross section shape of a hole of the lower frame is different.

FIG. 7 is a view illustrating an example in which a cross section shape of a hole of the lower frame 131 is different, in the same viewing field as that of FIG. 2. As illustrated in the drawing, a hole 235 of the lower frame 131 is in a tapered shape which widens toward the light guiding plate 121. As the hole 235 has the tapered shape, in a case where the LED 141 which is a thin type light source is used, while keeping the plate thickness of the lower frame 131 and retaining an intensity, it is possible to prevent the reflection of the light from the LED 141 on an inner wall surface of the hole 235, and to suppress an influence of generation of the bright line or the like to display quality.

Figure 8:
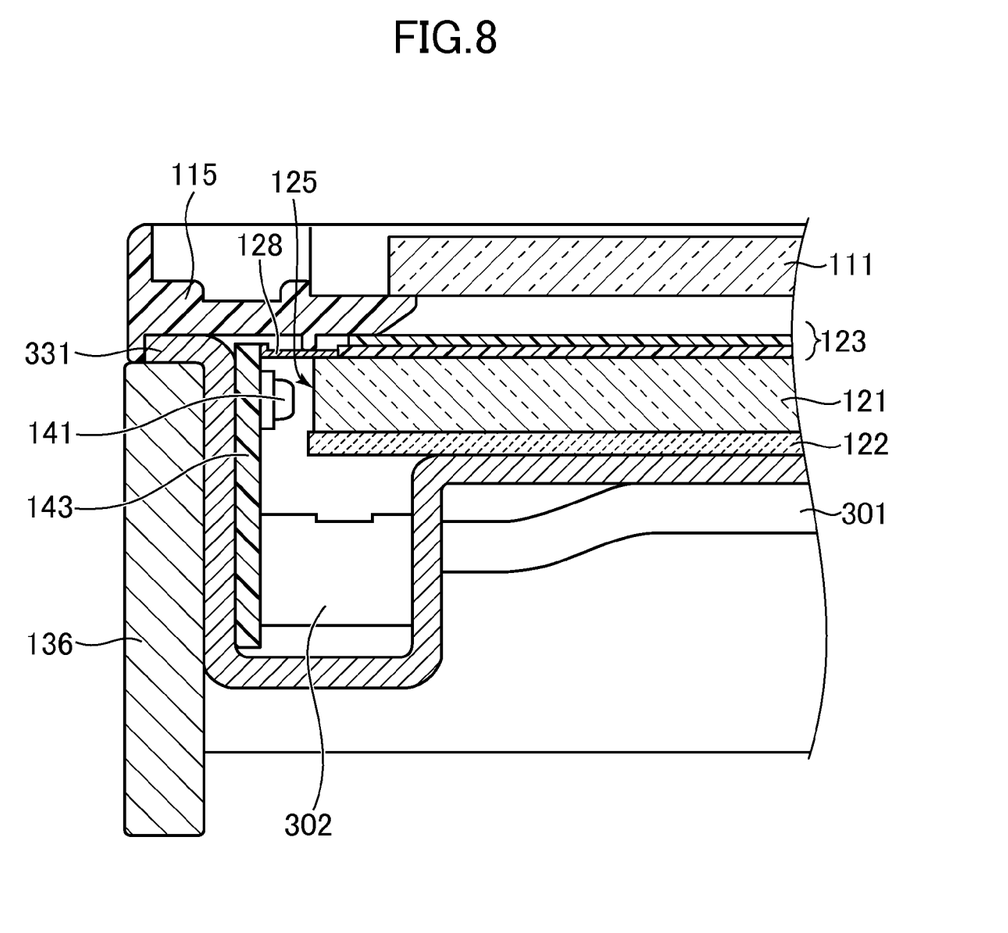
FIG. 8 is a view illustrating an example in which the lower frame has a different shape.

FIG. 8 is a view illustrating an example in which the lower frame has a different shape. In the example of the drawing, the light source wiring substrate 143 and the LED 141 are disposed on the inner side of a lower frame 331. On the light source wiring substrate 143, a connector 302 is mounted to connect a control cable 301, and the lower frame 331 is largely bent in a U shape to settle the light source wiring substrate 143 or the connector 302 therein. Even when the lower frame 331 in such a shape is used, the lower frame 331 and the light source wiring substrate 143 have a surface perpendicular to the emission direction of the light of the LED 141, and are the plate-shaped members disposed at least on the periphery of the LED 141. As the reflection member 128 which covers from the upper side of the emission surface close to the light incident surface 125 to the light source wiring substrate 143 is disposed, it is possible to achieve similar effects to that of the above-described embodiment. In other words, when the reflection member 128 is not provided, the light is emitted upward from the light incident surface 125 of the light guiding plate 121, is emitted to the liquid crystal panel 111 from the optical sheet 123 or the like, and causes the bright line or the like. However, since it is possible to cause the light which causes the bright line or the like to be incident on the light guiding plate 121, it is possible to improve display quality. In addition, since the light which is the leaked light in the related art is used, it is possible to improve efficiency of utilization of the light, to further improve brightness of the vicinity of the center of the display area, and to suppress brightness unevenness near the outer periphery of the light guiding plate 121. For this reason, it is possible to improve a brightness distribution. Furthermore, as the light guiding plate 121 and the reflection member 128 are adhered to each other, since it is possible to prevent the rattling sound, to suppress irregularity of a brightness distribution and improve efficiency of utilization of the light, and further, to suppress an influence by the color change of the adhesive material to a minimum, it is possible to keep high display quality even when the device is used for a longer period of time.

In the above-described embodiment, the light source is the LED 141, but another self-emitting type light emitting element may be used.

In a category of the idea of the invention, those who are skilled in the art can think of various modification examples and revision examples, and understand that the modification example and the revision examples are within the scope of the invention. For example, with respect to each embodiment described above, appropriate additions, removals, or design changes of constituent elements, or additions, omission, or condition changes of processes, by those who are skilled in the art, are included in the scope of the invention as long as the main idea of the invention is included.

While there have been described what are at present considered to be certain embodiments of the invention, it will be understood that various modifications may be made thereto, and it is intended that the appended claims cover all such modifications as fall within the true spirit and scope of the invention.

What is claimed is:

1. A liquid crystal display device, comprising:
   a plurality of light sources;
   a wiring substrate which electrically connects the plurality of light sources;
   a light guiding plate which takes in light generated from the plurality of light sources, from a light incident surface, and emits the light from an emission surface as planar light;
   a frame which has a surface perpendicular to an emission direction of the light of the plurality of light sources and is disposed at least around the plurality of light sources, wherein the frame supports the light guiding plate and the wiring substrate, the frame has a frame front surface which faces the light incident surface, and the frame has holes at positions of the frame front surface where the plurality of light sources are disposed; and
   a reflection member which covers from the emission surface of the light guiding plate to the frame, the reflection member being made of a material that reflects the light,
   wherein the wiring substrate is placed at the frame so that the plurality of light sources are disposed inside the holes and the light of the plurality of light sources is emitted from a rear surface side of the frame front surface.

2. The liquid crystal display device according to claim 1, wherein the reflection member has an L-shaped cross section and is adhered to a surface of the frame.

3. The liquid crystal display device according to claim 1, wherein, when the light guiding plate is viewed in a planar view, an area which is irradiated with the light from the plurality of light sources includes: fore-light-source areas each of which is a belt-shaped area extending in the emission direction of the light of the plurality of light sources; and inter-light-source areas each of which is a belt-shaped area other than the fore-light-source areas, and
   wherein the reflection member and the light guiding plate are adhered to each other only in the inter-light-source areas.

4. The liquid crystal display device according to claim 1, further comprising:
   a liquid crystal panel which controls transmission of the light by orientating a liquid crystal composition,
   wherein, when the light guiding plate is viewed in a side surface view, an angle α which is made by a straight line that links from an end of the reflection member on the light guiding plate to a display area of the liquid crystal panel in the shortest distance, and the emission surface of the light guiding plate, is equal to or less than 26°.

5. The liquid crystal display device according to claim 1, wherein the holes of the frame are in a tapered shape which widens toward an optical system of the light guiding plate.

6. The liquid crystal display device according to claim 1, further comprising:
   a heat sink which dissipates heat generated from the plurality of light sources, on a surface of the wiring substrate opposite to a surface on which the plurality of light sources are disposed,
   wherein the frame is in contact with the surface of the wiring substrate on which the plurality of light sources are disposed for dissipating the heat generated from the plurality of light sources.

7. The liquid crystal display device according to claim 6, wherein the wiring substrate and the frame, and the wiring substrate and the heat sink are respectively in contact with each other via a resin including a glass filler.

8. The liquid crystal display device according to claim 1, wherein, a reflection sheet is disposed on the frame front surface of the frame.

* * * * *